US009652853B2

(12) United States Patent
Matono et al.

(10) Patent No.: US 9,652,853 B2
(45) Date of Patent: May 16, 2017

(54) IMAGE PROCESSING DEVICE

(71) Applicant: Hitachi Automotive Systems, Ltd., Hitachinaka-shi, Ibaraki (JP)

(72) Inventors: Haruki Matono, Tokyo (JP); Yuji Otsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 247 days.

(21) Appl. No.: 14/439,076

(22) PCT Filed: Oct. 7, 2013

(86) PCT No.: PCT/JP2013/077195
§ 371 (c)(1),
(2) Date: Apr. 28, 2015

(87) PCT Pub. No.: WO2014/069169
PCT Pub. Date: May 8, 2014

(65) Prior Publication Data
US 2015/0310621 A1  Oct. 29, 2015

(30) Foreign Application Priority Data

Oct. 29, 2012  (JP) ................................ 2012-237591

(51) Int. Cl.
*G06K 9/00* (2006.01)
*G06T 7/00* (2017.01)
(Continued)

(52) U.S. Cl.
CPC ........ *G06T 7/0075* (2013.01); *G06K 9/00201* (2013.01); *G06T 7/593* (2017.01);
(Continued)

(58) Field of Classification Search
None
See application file for complete search history.

(56) References Cited

U.S. PATENT DOCUMENTS 5,726,704 A * 3/1998 Uomori .............. H04N 13/0014
348/47
5,801,760 A * 9/1998 Uomori .............. H04N 13/0014
348/47

(Continued)

FOREIGN PATENT DOCUMENTS

EP  1 311 130 A2  5/2003
JP  2009-122842 A  6/2009

(Continued)

OTHER PUBLICATIONS

Extended European Search Report issued in counterpart European Application No. 13852310.5 dated Jun. 8, 2016 (Ten (10) pages).
(Continued)

*Primary Examiner* — Feng Niu
(74) *Attorney, Agent, or Firm* — Crowell & Moring LLP

(57) ABSTRACT

For reduced processing time involved in an image recognition process, correctors 26a and 26b corrects two source images, acquired by two cameras during the imaging of an object, so that when the two source images are arranged side by side in a lateral direction, the imaged object has the same height in both images. A parallax calculation section 28 calculates, by block matching process, a parallax on the basis of the two corrected source images. A parallax image generation section 30 generates a parallax image on the basis of the parallax calculated by the parallax calculation section 28. If a block that has been used during block matching has a rectangular shape including an 'm' number of pixels in a longitudinal direction and an 'n' number of pixels in a lateral direction, a first reduced-image generation section 32 generates a first reduced image from one of the two corrected source images so that the number of pixels in the longitudinal direction is 1/m and so that the number of pixels in the lateral direction is 1/n. Thus, resolution of the first reduced image equals that of the parallax image. An image recog- (Continued)

nition section 34 performs image recognition of the object, on the basis of the parallax image and the first reduced image.

3 Claims, 5 Drawing Sheets

(51) Int. Cl.
*H04N 13/02* (2006.01)
*G06T 7/593* (2017.01)
*H04N 13/00* (2006.01)

(52) U.S. Cl.
CPC ..... *H04N 13/0239* (2013.01); *H04N 13/0271* (2013.01); *G06T 2200/28* (2013.01); *H04N 2013/0081* (2013.01)

(56) References Cited

U.S. PATENT DOCUMENTS

| | | | | |
|---|---|---|---|---|
| 7,065,245 | B2* | 6/2006 | Toda | H04N 13/0239 348/E13.014 |
| 8,090,195 | B2* | 1/2012 | Oyama | G01C 3/085 348/42 |
| 8,384,781 | B2* | 2/2013 | Higuchi | G06K 9/00805 348/148 |
| 9,076,214 | B2* | 7/2015 | Tsutsumi | G01S 5/16 |
| 9,077,907 | B2* | 7/2015 | Higuchi | G06K 9/2054 |
| 9,087,375 | B2* | 7/2015 | Sutou | H04N 13/0011 |
| 9,443,313 | B2* | 9/2016 | Muramatsu | G01C 3/06 |
| 2001/0045979 | A1* | 11/2001 | Matsumoto | G06K 9/20 348/43 |
| 2003/0085991 | A1 | 5/2003 | Toda | |
| 2009/0153664 | A1 | 6/2009 | Higuchi et al. | |
| 2010/0150455 | A1 | 6/2010 | Oyama | |
| 2013/0082040 | A1* | 4/2013 | Kawamoto | B23K 9/0731 219/137.71 |
| 2013/0082041 | A1* | 4/2013 | Kawamoto | B23K 9/0731 219/137.71 |

FOREIGN PATENT DOCUMENTS

| | | |
|---|---|---|
| JP | 2009-146217 A | 7/2009 |
| JP | 2012-150614 A | 8/2012 |
| WO | WO 2009/101798 A1 | 8/2009 |

OTHER PUBLICATIONS

Halawana, H., "Partial Demosaicing of CFA Images for Stereo Marching", Ph.D. Thesis, University Lille 1, No. 40421, LAGIS FRE-CNRS-3303, Jan. 1, 2010, URL Retrieved from: http://lagis-vi.univ-lille1.fr/~lm/theses/thesis_halawana.pdf [retrieved on Jan. 29, 2014] (One-hundred and fifty-eight (158) pages).
International Search Report (PCT/ISA/210) dated Jan. 7, 2014 with English-language translation (two (2) pages).

* cited by examiner

IMAGE PROCESSING DEVICE

TECHNICAL FIELD

The present invention relates to image processing devices that perform image recognition of an object.

BACKGROUND ART

An image-processing device for performing image recognition of an object is known (See Patent Document 1, for example). The image-processing device performs image recognition process comprising: calculating the amount of shift in position of an object (namely parallax (disparity)), generating a parallax image, and recognizing a three-dimensional position of the object by using the parallax image and the source images.

PRIOR ART DOCUMENTS

Patent Document

Patent Document 1: JP-2009-146217-A

SUMMARY OF THE INVENTION

With consideration for reduction of processing load upon the image processing device, the generation of the parallax image may be based on the parallax that has been calculated by block matching. In this case, the parallax is calculated for each block that has been used during block matching, that is, one by one for each of a plurality of pixels. Thus, the parallax image in which one parallax information is corresponded to each of a plurality of pixels apparently has lower resolution than the source image in which one luminance information is corresponded to each one of pixels.

However, where the resolution of the parallax image differs from that of each source image, the position of the corresponding pixel between the parallax image and the source image will need to be calculated for each pixel during the image recognition process performed using the two images, and the image recognition process is likely to consume a correspondingly large amount of time. The processing time can be reduced by performing the image recognition process in parallel, but the circuit structure required for the process would be larger-sized or more complex.

Accordingly, the present invention that has been made with the above problems in mind is intended to provide an image processing device adapted to reduce a processing time required for an image recognition process relating to an object.

Means for Solving the Problem

To this end, an image processing device according to an aspect of the present invention calculates, by use of block matching, a parallax based on two source images of an object acquired with two cameras, and generates a parallax image on the basis of the calculated parallax. In addition, the device generates a reduced image by reducing at least one of the two source images so that the source image matches with the parallax image, and performs image recognition of the object on the basis of the parallax image and the reduced image.

Effects of the Invention

The image processing device according to an aspect of the present invention reduces a processing time required for the image recognition process relating to the object.

MODES FOR CARRYING OUT THE INVENTION

Hereunder, a first exemplary embodiment of the present invention will be described with reference to the accompanying drawings.

An image processing device according to the present embodiment calculates, by use of block matching, a shift in position of an object, that is, a parallax, on a pair of images that a stereo camera obtains by imaging the object in the same timing but from different positions, and then calculates a three-dimensional position of the object by use of a known conversion equation. That is to say, the present device performs image-based recognition of objects. The device can be applied to various systems that require object recognition, such as a surveillance system that monitors for intrusions of suspicious individuals, and a vehicle-mounted system that predicts a risk of collisions against obstacles and supports safe driving.

Figure 1:
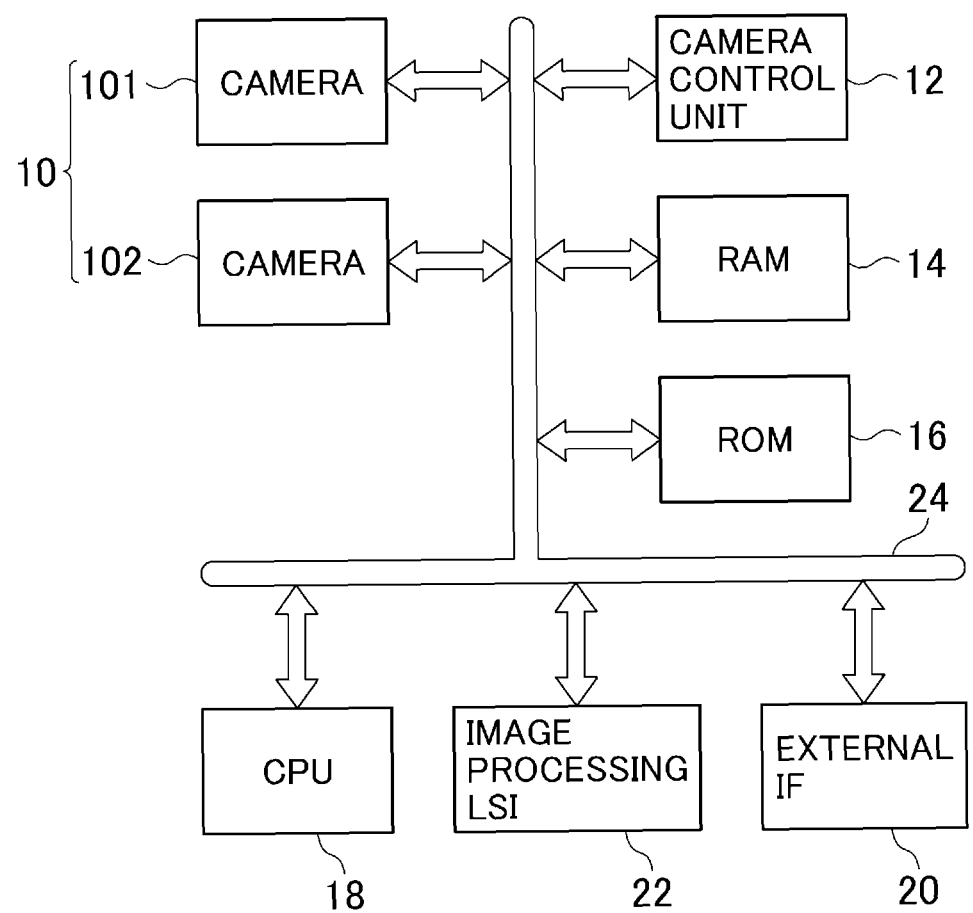
FIG. 1 is an explanatory diagram schematically showing an image recognition system configuration in a first embodiment of the present invention.

FIG. 1 shows an example of an image recognition system including the image processing device.

The image recognition system includes the following elements: a stereo camera 10 constituted by two cameras 101 and 102; a camera control unit 12 that controls the stereo camera 10; a random-access memory (RAM) 14 that is a temporary storage region; read-only memory (ROM) 16 for storing programs and various initial values; a central processing unit (CPU) 18 that controls the entire image recognition system; an external interface (IF) 20 from which recognition information on the object recognized by the image recognition system is output to the outside of the image recognition system; and image recognition large-scale integration (LSI) 22. The system elements exchange data via a communication bus 24.

Figure 2:
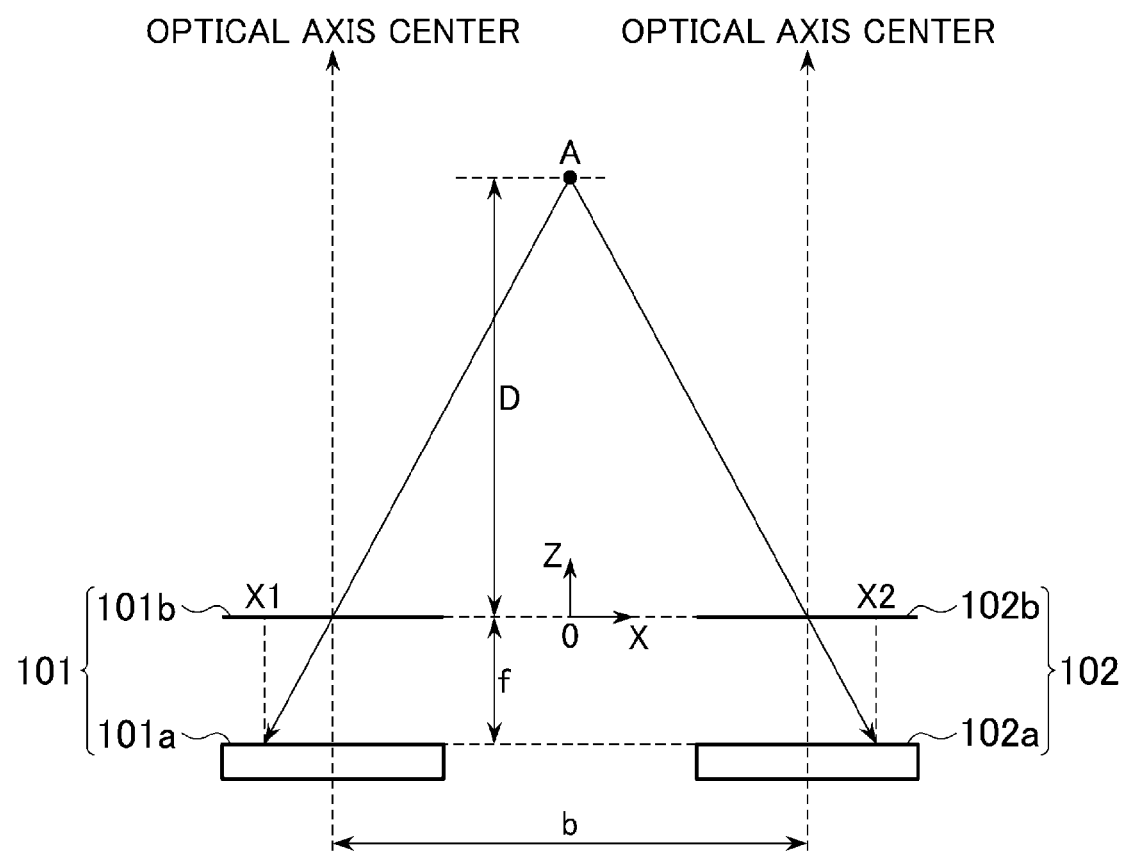
FIG. 2 is an explanatory diagram showing a stereo camera and a triangulation technique using the camera.

As shown in FIG. 2, the stereo camera 10 includes image pickup elements 101a and 102a such as charge-coupled device (CCD) image sensors or complementary metal-oxide semiconductor (CMOS) image sensors, and after receiving incident light that has entered the image pickup elements 101a and 102a through lenses 101b and 102b from the object being imaged, the stereo camera 10 converts the light into an electrical signal corresponding to intensity of the light. The thus-obtained electrical signal is output to the RAM 14 via the communication bus 24 or directly output to the image processing LSI 22, as source image data that represents luminance information about the object being imaged. Sizes of the source images depend on the number of pixels in the image pickup element 101a or 102a. In the present embodiment, for example, the sizes of the source images are nearly 10 megabytes.

Let the stereo camera 10 be disposed so that its optical axis is in parallel to a z-axis of an xz plane in an xyz coordinate system of a three-dimensional space and so that the lenses 101b and 102b are on an x-axis as shown. The light from the object A being imaged enters the image pickup element 101a through the lens 101b of the camera 101 so that the x-coordinate x1 is obtained and the light from the object A being imaged enters the image pickup element 102a through the lens 102b of the camera 102 so that the x-coordinate x2 is obtained, then an absolute value of $|x_1-x_2|$ of a difference between the x-coordinate $x_1$ and the x-coordinate $x_2$ is obtained as a parallax δ. A z-coordinate of the object A being imaged, that is, a distance D from the stereo camera 10 to the object A being imaged, is calculated as per the following expression using, as parameters, the parallax δ, baseline length of the two cameras (i.e., a distance between optical axes) 'b', and a focal length 'f' between the lens 101b or 102b and the image pickup element 101a or 102a.

$$D=b\times f/\delta$$

The following description of the present embodiment assumes that the stereo camera 10 is of a parallel equal-positioned stereo camera with the cameras 101 and 102 arranged side by side, in parallel, and at the same height. It goes without saying, however, that the present invention is not limited to this camera arrangement.

The camera control unit 12 is a circuit that controls the cameras 101 and 102. More specifically, the camera control unit 12 controls the cameras 101 and 102 to image the object in the same timing. It is because the parallax δ cannot be calculated according to the latest position of the target object to image if the image acquisition timings at cameras 101 and 102 are different and the position of the target object changes between the timings. The camera control unit 12 also controls the cameras 101 and 102 so that respective amounts of photographic exposure are equal to each other. This control ensures that if the same target object is associated with the same luminance value in the two source images, matching accuracy improves during a block matching process described later herein.

The image processing LSI 22 is an image processor that performs the image-based recognition of the object by receiving via the communication bus 24 the two sets of source image data that have been output from the stereo camera 10.

Figure 3:
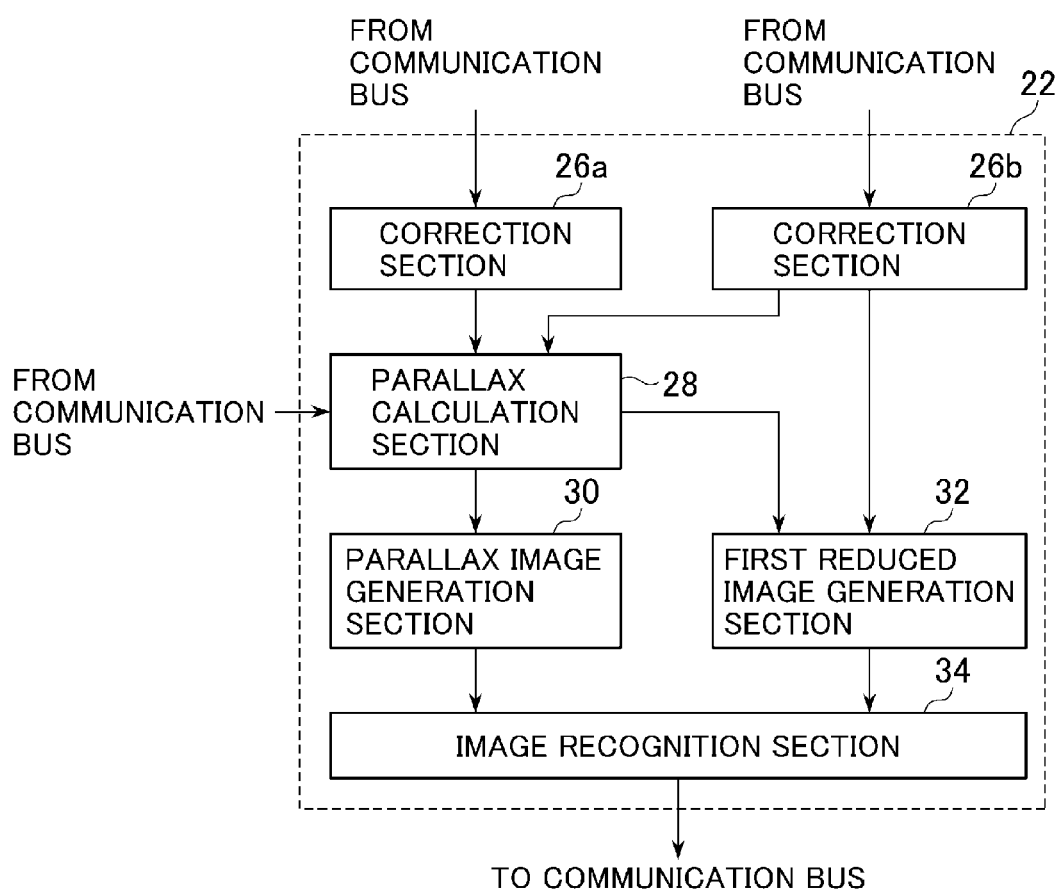
FIG. 3 is a block diagram that shows details of processing executed by image recognition LSI in the first embodiment of the present invention.

FIG. 3 shows details of processing executed in the image processing LSI 22.

The image processing LSI 22 includes correction sections 26a and 26b, a parallax calculation section 28, a parallax image generation section 30, a first reduced-image generation section 32, and an image recognition section 34.

The correction sections 26a and 26b convert two inputted source image data so that when the two source images are arranged side by side in a lateral direction, the imaged object has the same height. The correction sections thereby facilitate the block matching process (described later herein) that the parallax calculation section 28 performs. The correction sections 26a and 26b obtain correction data for the conversions by referring to a correction data table, which is stored within the ROM 16, that is created by conducting a calibration in advance. During the calibration, distortions of the lenses 101b and 102b, errors in mounting position/angle of the cameras 101 and 102, and other errors are measured beforehand and the correction data is calculated.

The parallax calculation section 28 forms a parallax calculator that calculates the parallax by use of the block matching process on the basis of the two sets of source image data that the correction sections 26a and 26b have corrected.

Figure 4A:
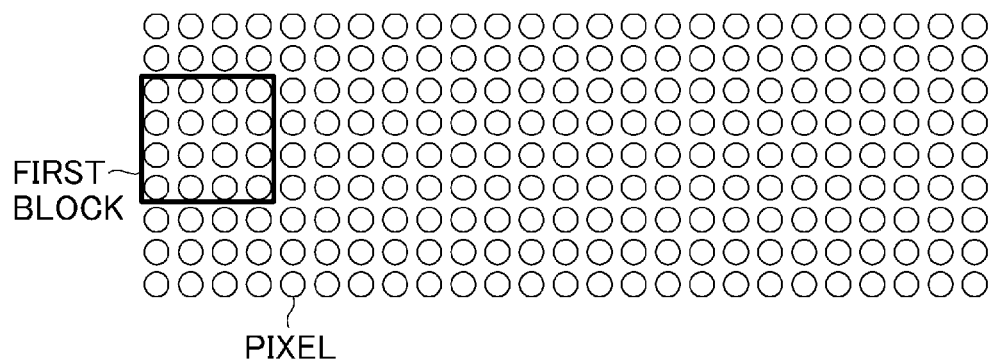
FIG. 4 shows a block matching process, with section (a) of FIG. 4 representing a method of setting a first block in a reference image, and section (b) of FIG. 4 representing a method of searching by a second block in a comparison image.
Figure 4B:
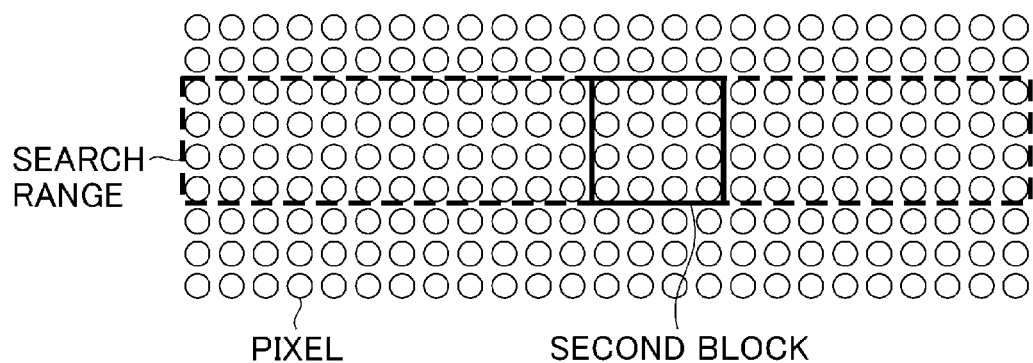

The block matching process comprises: separating one of the two source images (hereinafter referred to as a reference image), as shown in FIG. 4(a), with a first block (a thick solid line in the figure) having a predetermined shape so as to include a plurality of pixels, separating the other of the two source images (hereinafter referred to as a comparison image), as shown in FIG. 4(b), with a second block (a thick solid line in the figure) of the same size, shape, and position as those of the first block, shifting the second block in increments of one pixel in a lateral direction, calculating a correlation value between two luminance patterns in the first block and the second block, and searching the position where the correlation value becomes the lowest, that is, the correlation is the highest. In the present embodiment, the calculation of the correlation value uses a sum of absolute differences (SAD). However, the use of SAD is not the only calculating method usable and any other known method can be used. If the position of the highest (strongest) correlation is identified as a result of the search, a distance between a specific pixel (e.g., lower left pixel) in the first block and a specific pixel (e.g., lower left pixel) in the second block at the identified position is calculated as the parallax δ. This is regarded as one step, and substantially the same step is executed for all pixels in the reference image. The calculated parallax δ is associated with the position of the first block or the second block when the parallax δ is calculated and may be temporarily stored into the RAM 14, for example.

While in sections (a) and (b) of FIG. 4 the first block and the second block are each shown as having a substantially square shape with 16 pixels, four in a longitudinal direction and four in a lateral direction, the first block and the second block do not need to be limited to this size and shape and may both be rectangular. In other words, the number of pixels contained in the first block and the second block may be 'm' in the longitudinal direction and 'n' in the lateral direction (where 'm' and 'n' are both a natural number greater than or equal to 1 and either is greater than or equal to 2). In addition, if the source images are parallelograms, the first block and the second block may both be formed into a shape of a parallelogram, containing a plurality of pixels.

The sizes of the first block and second block used in the block matching process can be changed. For example, if the CPU 18 determines that an ability to recognize the object from the images is likely to decrease for a reason such as weather conditions, the CPU 18 may instruct the parallax calculation section 28 to reduce the sizes of the first block and the second block. Conversely, if the CPU 18 determines that the weather conditions or the like does not affect the image recognition ability and that priority should be assigned to a processing burden upon the LSI, the CPU 18 may instruct the parallax calculation section 28 to increase the sizes of the first block and the second block.

The parallax image generation section 30 forms a parallax image generator that generates the parallax image on the basis of the parallax δ that the parallax calculation section 28 calculated.

The parallax image generation section 30 associates the parallax δ calculated by the parallax calculation section 28, with the entire set of pixels existing in one of the first block of the reference image and the second block of the comparison image when the calculation was conducted, then repeats the association for all parallaxes δ, and thus generates the parallax image. For this reason, the parallax image is generated on the basis of one of the reference image and the comparison image. The association may be conducted by assigning one hue information depending on the parallax δ, to the entire set of pixels in the first block or the second block. The parallax image is corresponded to one parallax information per a plurality of the pixels and apparently has lower resolution than the source image in which one luminance information is corresponded to each one of pixels.

Instead of starting the generation of the parallax image after the calculation of all parallaxes δ by the parallax calculation section 28, the parallax image generation section 30 may generate the parallax image by sequentially associating the parallax δ with the reference image or the comparison image every time the parallax δ is calculated, in which case the parallax calculation section 28 will not need to output the calculated parallaxes δ to the RAM 14.

The first reduced-image generation section 32 forms a first reduced-image generator for generating a first reduced image that is reduced from one of the two source images converted by the correction sections 26a and 26b in accordance with the block used in the block matching by the parallax calculation section 28.

Which of the two source images is reduced by the first reduced-image generation section 32 depends on whether the generation of the parallax image was based on the reference image or the comparison image. If the parallax image was based on the reference image, the source image that was used as the reference image is reduced, and if the parallax image was based on the comparison image, the source image that was used as the comparison image is reduced.

A method of the reduction is described in detail below. One of the two source images is reduced according to a shape of the block used during block matching. For example, if the first block and the second block are square or rectangular in shape and this shape contains an (m by n) number of pixels formed by an 'm' number of pixels in the longitudinal direction and an 'n' number of pixels in the lateral direction, the source image is reduced so that the number of pixels in a longitudinal direction in the first reduced image is the number of pixels obtained by dividing the number of pixels in the longitudinal direction in the source image by 'm', and so that the number of pixels in a lateral direction in the first reduced image is the number of pixels obtained by dividing the number of pixels in the lateral direction in the source image by 'n'. Thus, resolution of the parallax image and that of the first reduced image become equal.

The image recognition section 34 forms an image recognizer that performs the image recognition of the object, based on both the parallax image generated by the parallax calculation section 28, and the first reduced image generated by the first reduced-image generation section 32. To be more specific, the image recognition section 34 performs process of identifying the object by use of pattern matching that uses the luminance information of the first reduced image. The image recognition section 34 performs the image recognition of the object by calculating a three-dimensional position of the identified object from the parallax information of the parallax image. At this time, which region in the parallax image is corresponded to the region of the object identified in the first reduced image, that is, the positions of the corresponding pixels between the parallax image and the first reduced image, are calculated. The object recognition information that the image recognition section 34 has obtained is output to the external IF 20 via the communication bus 24.

In the image processing LSI 22 having the above configuration, since the resolution of the parallax image and that of the first reduced image become equal, it becomes unnecessary for the image recognition section 34 to compute, with respect to all pixels, the corresponding pixel position between the parallax image and the first reduced image. The time consumed in the image recognition process can be correspondingly reduced.

In addition, if the sizes of the first block and second block used during block matching by the parallax calculation section 28 are increased in a range not affecting the image recognition ability of the LSI in order to reduce the processing burden upon the LSI when source image data size increases as the stereo camera's resolution becomes high, the time that the image recognition section 34 consumes in the image recognition process is little affected since the resolution of the parallax image and that of the first reduced image are equal.

When the RAM 14 has a capacity large enough to enable high-resolution image saving, the first reduced-image generation section 32 may reduce the source image in the following manner. That is to say, if the first block and the second block are square or rectangular and these blocks contain an 'm' number of pixels in the longitudinal direction and an 'n' number of pixels in the lateral direction, a predetermined value 'k' that is a natural number greater than or equal to 2 may be used to reduce the source image so that the number of pixels in the longitudinal direction in the first reduced image will be the number of pixels obtained by dividing the number of pixels in the longitudinal direction in the source image by (m×k), and so that the number of pixels in the lateral direction in the first reduced image will be the number of pixels obtained by dividing the number of pixels in the lateral direction in the source image by (n×k). If the source image is reduced in this way, the processing burden involved in the position calculation of the corresponding pixel between the parallax image and the first reduced image will also be lighter than if the source image is not reduced.

In the embodiment described above, the image processing LSI 22 may include an extracted-image generation section, instead of the first reduced-image generation section 32, to generate an extracted image obtained by partially extracting a source image converted by at least one of the correction sections 26 and 26b. In the extracted image, as compared to the parallax mage, only the luminance information of only part of the imaging range by camera 101 or 102 is obtained. However, for example, the extracted-image generation section may determine the region to watch by focusing on what time variations is shown at each pixel by the luminance information indicated by the source image and generate an extracted image according to shapes of the first block and the second block so as to include the pixels of this region to watch. The processing burden of the image recognition section 34 in the image recognition process will then be lighter.

In addition, in the embodiment described above, of the correction sections 26a and 26b, the source image converted by the correction section 26b has been used for the first reduced-image generation section 32 to generate the first reduced image. However, image generation is not limited to this method and either the source image converted by the correction section 26a, or the two source images converted by both correction sections 26a and 26b, may be used instead.

Next, a second exemplary embodiment of the present invention will be described. The same elements as in the first embodiment will be assigned the same reference numbers, and description of these elements will be omitted or simplified.

Figure 5:
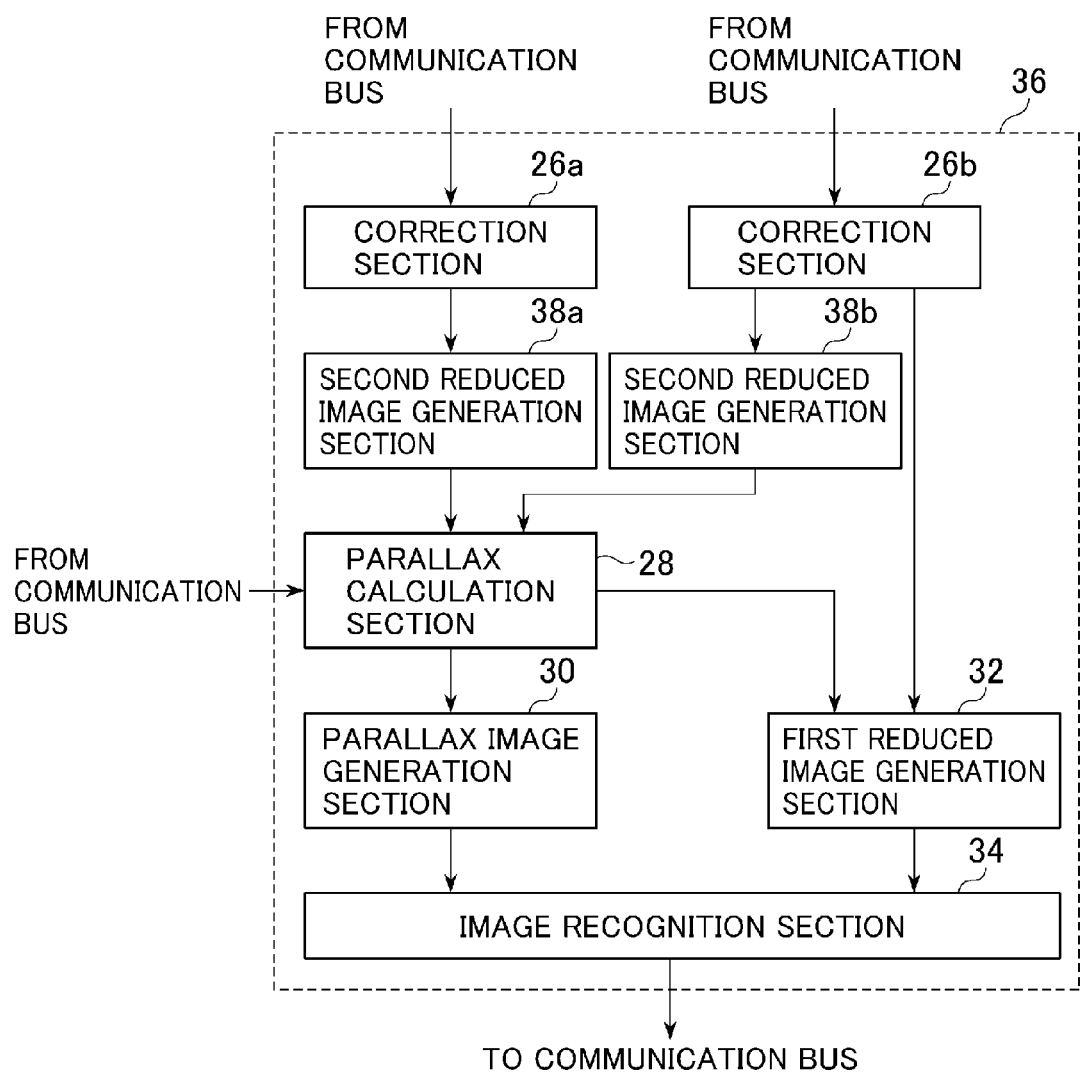
FIG. 5 is a block diagram that shows details of processing executed by image recognition LSI in another embodiment of the present invention.

FIG. 5 is a diagram that shows details of processing executed by image recognition LSI 36 in the second embodiment of the present invention.

The image recognition LSI 36 in the second embodiment differs from the image recognition LSI 22 in the first embodiment in that processes by second reduced-image generators 38a and 38b are added between correction sections 26a and 26b and a parallax calculation section 28.

The second reduced-image generators 38a and 38b each form a second reduced-image generator for respectively reducing a source image converted by the correction section 26a or 26b to generate two second reduced image. Instead of the two source images converted by the correction sections 26a and 26b, the second reduced images generated by the second reduced-image generators 38a and 38b are used for the parallax calculation section 28 to calculate a parallax.

In addition, if the image pickup elements 101a and 102a of two cameras 101 and 102 have a color filter, the second reduced-image generators 38a and 38b restore a color based on a pattern of the color filter and reduce the two source images converted by the correction sections 26a and 26b according to the pattern of the color filter.

For example, if the color filter has a pattern cyclically appearing in units of an (i×j) number of pixels formed by an 'i' number of pixels in a longitudinal direction and a 'j' number of pixels in a lateral direction, the second reduced-image generation section 38a, 38b generates a second reduced image by using a predetermined number 'h' greater than or equal to 1 so that the number of pixels in a longitudinal direction in the second reduced image is the number of pixels obtained by dividing the number of pixels in longitudinal directions of the two source images by (i×h), and so that the number of pixels in a lateral direction in the second reduced image is the number of pixels obtained by dividing the number of pixels in lateral directions of the two source images by (j×h). For example, if the pattern of the color filter is of a Bayer array, the same pattern cyclically appears every four pixels of two pixels longitudinally and two pixels laterally. In this case, the second reduced-image generation section 38a, 38b generates a second reduced image so that the number of pixels in a longitudinal direction in the second reduced image is the number of pixels obtained by dividing the number of pixels in longitudinal directions of the two source images by (2×h), and so that the number of pixels in a lateral direction in the second reduced image is the number of pixels obtained by dividing the number of pixels in lateral directions of the two source images by (2×h).

With the above-described image processing LSI 36 of the second embodiment, if resolution of a stereo camera 10 becomes high to suppress a false color that often becomes a problem in color reproduction process, a processing burden upon the parallax calculation section 28 is reduced since the source images that have been output from the stereo camera 10 are reduced in size by the second reduced-image generators 38a and 38b.

Additionally, in order to suppress occurrence of a false color, optical low-pass filters inserted between the lens 101b and the image pickup element 101a and between the lens 102b and the image pickup element 102a are unnecessary, which contributes at least to reducing manufacturing costs of the image recognition system.

DESCRIPTION OF REFERENCE CHARACTERS

10: Stereo camera
101: Camera
102: Camera
101a: Image pickup element
102a: Image pickup element
22: Image processing LSI
24: Communication bus
28: Parallax calculation section
30: Parallax image generation section
32: First reduced-image generation section
34: Image recognition section
36a: Second reduced-image generation section
36b: Second reduced-image generation section

The invention claimed is:

1. An image processing device comprising:
a parallax calculator for calculating a parallax by using a block matching on the basis of two source images of an object that are acquired with two cameras;
a parallax image generator for generating a parallax image on the basis of the parallax calculated by the parallax calculator;
a first reduced-image generator for generating a first reduced image by reducing at least one of the two source images so that the source image matches with the parallax image; and
an image recognizer for performing image recognition of the object, based upon the parallax image and the first reduced image;
wherein the first reduced-image generator reduces at least one of the two source images according to a shape of a block used in the block matching,
the shape of the block is square or rectangular, and where the number of pixels contained in the block is m in a longitudinal direction and n in a lateral direction, the first reduced-image generator generates the first reduced image by using a predetermined number k greater than or equal to 1 in terms of natural number so that the number of pixels in a longitudinal direction of the first reduced image is the number of pixels obtained by dividing the number of pixels in longitudinal directions of the two source images by (m×k), and so that the number of pixels in a lateral direction of the first reduced image is the number of pixels obtained by dividing the number of pixels in lateral directions of the two source images by (n×k).

2. The image processing device according to claim 1, wherein the predetermined number k is 1.

3. An image processing device comprising:
a parallax calculator for calculating a parallax by using a block matching on the basis of two source images of an object that are acquired with two cameras;
a parallax image generator for generating a parallax image on the basis of the parallax calculated by the parallax calculator;
a first reduced-image generator for generating a first reduced image by reducing at least one of the two source images so that the source image matches with the parallax image;

an image recognizer for performing image recognition of the object, based upon the parallax image and the first reduced image; and a second reduced-image generator for respectively generating two second reduced images by reducing the two source images, the two second reduced images being used, instead of the two source images, for the parallax calculator to calculate a parallax;

wherein, where image pickup elements of the two cameras comprise a color filter, the second reduced-image generator restores a color on the basis of a pattern of the color filter, the second reduced-image generator further reducing the two source images according to the pattern of the color filter, where the pattern of the color filter cyclically appears with every i pixels in a longitudinal direction and every j pixels in a lateral direction, the second reduced-image generator generates the second reduced image by using a predetermined number h greater than or equal to 1 so that the number of pixels in a longitudinal direction in the second reduced image is the number of pixels obtained by dividing the number of pixels in longitudinal directions of the two source images by (i×h), and so that the number of pixels in a lateral direction in the second reduced image is the number of pixels obtained by dividing the number of pixels in lateral directions of the two source images by (j×h).

\* \* \* \* \*